(12) United States Patent
Ortigosa Vallejo et al.

(10) Patent No.: US 7,520,440 B2
(45) Date of Patent: *Apr. 21, 2009

(54) CONTACTLESS IDENTIFICATION DEVICE

(75) Inventors: Juan Ignacio Ortigosa Vallejo, Barcelona (ES); Carles Puente Baliarda, Barcelona (ES)

(73) Assignee: Fractus, S.A., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 11/789,724

(22) Filed: Apr. 24, 2007

(65) Prior Publication Data

US 2008/0006703 A1    Jan. 10, 2008

Related U.S. Application Data

(63) Continuation of application No. 10/858,457, filed on Jun. 1, 2004, now Pat. No. 7,222,798, which is a continuation of application No. PCT/EP01/14453, filed on Dec. 10, 2001.

(51) Int. Cl.
*G06K 19/05* (2006.01)

(52) U.S. Cl. ........................ 235/492; 235/487

(58) Field of Classification Search .............. 235/375, 235/487, 492, 494
See application file for complete search history.

(56) References Cited

U.S. PATENT DOCUMENTS

| | | |
|---|---|---|
| 5,172,084 A | 12/1992 | Fiedziuszko et al. |
| 5,337,063 A | 8/1994 | Takahira |
| 6,140,975 A | 10/2000 | Cohen |
| 6,147,655 A | 11/2000 | Roesner |
| 6,285,342 B1 | 9/2001 | Brady et al. |
| 6,366,260 B1 | 4/2002 | Carrender |
| 6,421,013 B1 | 7/2002 | Chung |
| 6,535,175 B2 | 3/2003 | Brady et al. |
| 6,563,463 B1 | 5/2003 | Saito |
| 6,677,917 B2 | 1/2004 | Van Heerden et al. |
| 6,745,945 B1 | 6/2004 | Limelette |
| 6,870,507 B2 | 3/2005 | Anguera Pros et al. |

(Continued)

FOREIGN PATENT DOCUMENTS

DE        19500925 A1    7/1996

(Continued)

OTHER PUBLICATIONS

Xianming Qing, et al., "A Novel Single-Feed Circular Polarized Slotted Loop Antenna", 1999, IEEE, (4 pages).

*Primary Examiner*—Daniel St. Cyr
(74) *Attorney, Agent, or Firm*—Winstead PC (57) ABSTRACT

The invention relates to a contact-less identification device comprising a flat conducting structure as an electromagnetic sensor or transducer, and more particularly the invention relates to contactless cards, hybrid cards and radio operated electronic labels and tags. The electromagnetic sensor architecture according to the invention is suitable for all the applications where contactless or hybrid cards are of advantage: high volume paying and toll applications (public transportation, public sport events, person and good identification, access to controlled areas, control of shipment of goods, handling of luggage, product control in chain production environments), etc. The contact-less identification device according to the invention has had its performance enhanced by the use of space-filling techniques in the design of its electromagnetic sensor and by the use of a planar capacitor in conjunction with said flat conducting structure.

51 Claims, 11 Drawing Sheets

| U.S. PATENT DOCUMENTS | | | |
|---|---|---|---|
| 7,222,798 B2 * | 5/2007 | Ortigosa Vallejo et al. | .. 235/492 |
| 2002/0005433 A1 | 1/2002 | Nochi et al. | |
| 2003/0142036 A1 | 7/2003 | Wilhelm et al. | |
| 2004/0217916 A1 | 11/2004 | Quintero Illera et al. | |

FOREIGN PATENT DOCUMENTS

| WO | 00/34916 A1 | 6/2000 |
|---|---|---|
| WO | 01/04957 A1 | 1/2001 |
| WO | WO-01/22528 | 3/2001 |
| WO | WO-01/54221 | 7/2001 |
| WO | WO-01/54225 | 7/2001 |
| WO | 02/01495 A1 | 1/2002 |

* cited by examiner

CONTACTLESS IDENTIFICATION DEVICE

This patent application is a continuation of U.S. patent application Ser. No. 10/858,457, filed on Jun. 1, 2004, now U.S. Pat. No. 7,222,798, which is a continuation of PCT/EP01/014453, filed Dec. 10, 2001. U.S. patent application Ser. No. 10/858,457 and International Patent Application PCT/EP01/014453 are incorporated herein by reference.

OBJECT OF THE INVENTION

The invention relates, in general, to a contact-less identification device comprising a flat conducting structure as an electromagnetic sensor or transducer, and more particularly the invention relates to contactless cards, hybrid cards and radio operated electronic labels and tags. The electromagnetic sensor architecture according to the invention is suitable for all the applications where contactless or hybrid cards are of advantage: high volume paying and toll applications (public transportation, public sport events, person and good identification, access to controlled areas, control of shipment of goods, handling of luggage, product control in chain production environments), etc.

The contact-less identification device has had its performance enhanced by the use of space-filling techniques in the design of its electromagnetic sensor and by the use of a planar capacitor in conjunction with said flat conducting structure.

BACKGROUND OF THE INVENTION

The use of Integrated Circuit (IC) cards has been going on for several years in multiple applications. These applications range, in terms of complexity, from simple token-wise payment applications in private environments to complex and intrinsically secure electronic banking applications including powerful encryption and decryption mechanisms. The interaction of the IC in the card with the reader is made through a set of metallic contacts on the surface of the card.

The public interest in many of today's applications of IC cards is greatly increased if the operation of the card does not require a mechanical interaction of the user with the reading device, thus allowing a much faster operation and an increased roughness of the reader that reflects in an increase in the reliability of the system. This is one of the main reasons for the development, which continues today with new standards being defined and tested, of the contactless operation of IC cards and electronic labels or tags.

There has been some effort put in the development of the electromagnetic sensor to be used in the contactless operation of the cards, but the outcome of this development has been the design of the electromagnetic sensor architectures that are not optimally using the available space within the card or tag.

Figure 10:
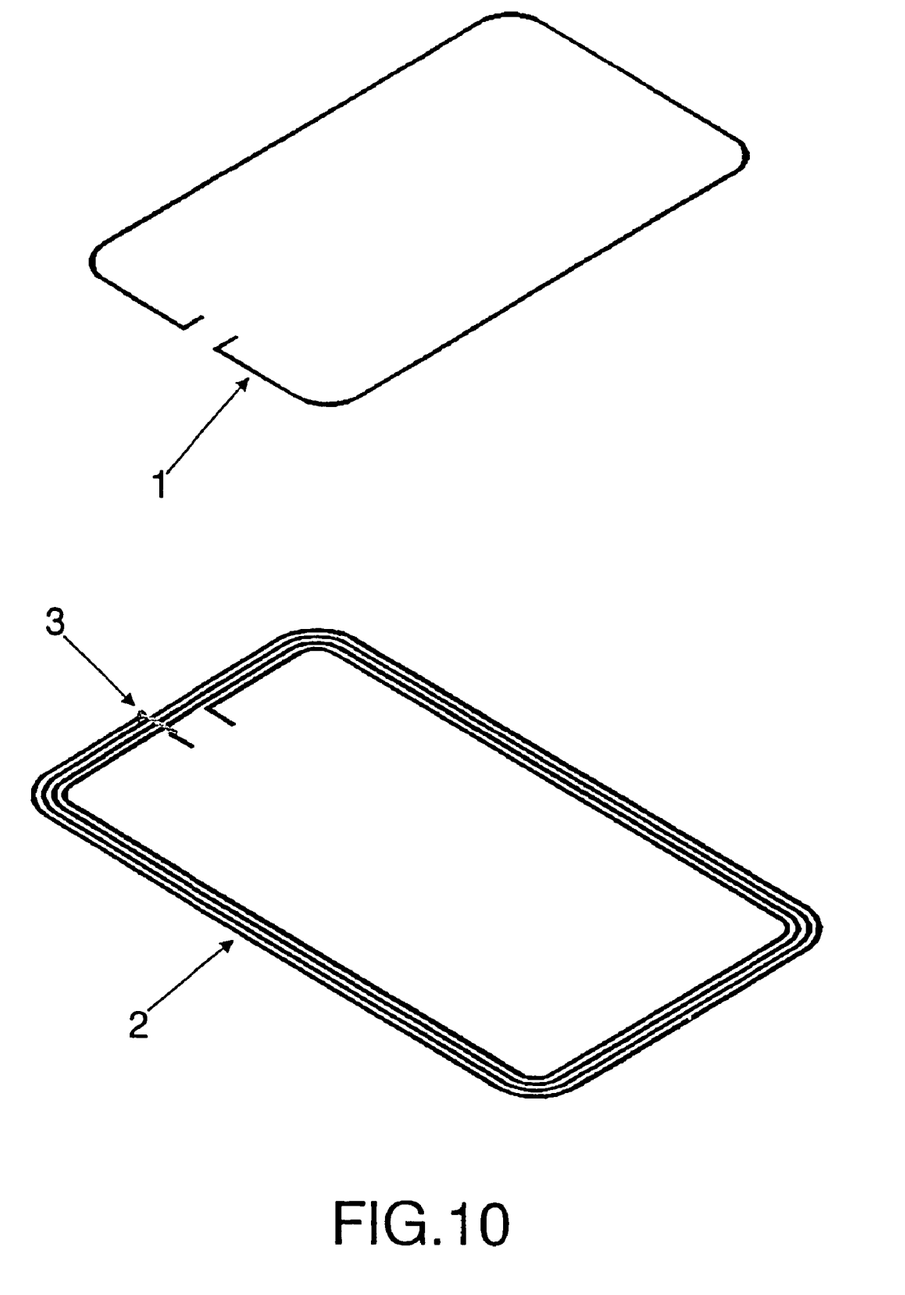
FIG. 10 shows two examples of current art in the design of electromagnetic sensor for contactless or hybrid cards. A single-turn flat loop (1) and a multiple-turn flat loop (2) are presented. The most important detail is the use of a wire running at a higher (3) level to overcome the need to cross over the loop windings and locate the two electromagnetic sensor contacts in the same side of the loop.

In low frequency applications, where the coupling of the IC chip to the contactless reader is made via an inductive coupling, the most common solution has been the use of multiple-turn coils (see (2) in FIG. 10), which imply quite a complicated manufacturing process because of the fact that the two ends of the coils are located in different sides with respect to the coil windings (see bridge (3) in FIG. 10). Other simpler solutions such as (1) are convenient in terms of manufacturing simplicity, but feature a poor in performance.

In applications at higher frequencies, the minimum size of the electromagnetic sensor is determined by the wavelength at the operation frequency, and this fact implies that there is a clear compromise between the performance of the electromagnetic sensor and its size. This compromise has been solved with a limitation of the electromagnetic sensor size to values that are suitable for the final product, at the expense of obtaining electromagnetic sensor performances that are far from optimal.

The set of geometries named Space-Filling Curves (hereinafter SFC) were described in the patent publication WO 01/54225 wherein said space-filling curve was defined as a curve composed by at least ten connected straight segments, wherein said segments are smaller than a tenth of the operating free-space wave length and they are spatially arranged in such a way that none of said adjacent and connected segments form another longer straight segment, wherein none of said segments intersect to each other except optionally at the tips of the curve, wherein the corners formed by each pair of said adjacent segments can be optionally rounded or smoothed otherwise, and wherein the curve can be optionally periodic along a fixed straight direction of space if and only if the period is defined by a non-periodic curve composed by at least ten connected segments and no pair of said adjacent and connected segments define a straight longer segment.

In said document the space-filling curve features a box-counting dimension larger than one, being said box-counting dimension computed as the slope of the straight portion of a log-log graph, wherein such a straight portion is substantially defined as a straight segment over at least an octave of scales on the horizontal axes of the log-log graph.

SUMMARY OF THE INVENTION

The present invention optimizes the performance of the electromagnetic sensor or inductive element used in the contactless cards, hybrid cards and radio frequency operated labels and tags by incorporating a capacitive element connected in parallel to the electromagnetic sensor and by including in the design of the electromagnetic sensor geometry, in the capacitive element geometry, or in both cases the use of space-filling curves (SFC). This allows an optimal utilization of the limited area and volume within the card or label.

This invention is aimed at two main goals: on one hand, it presents a new procedure to improve the performance of electromagnetic sensors designed for inductive coupling, and on the other hand this invention portrays the advantages of using space-filling curves in order to optimize the solution to the performance-size compromise in applications for radiation coupling.

In applications where the radio frequency operation of the device implies an inductive coupling of the sensor to the electromagnetic field generated by the coupling device (the card/label reader), this method allows the optimization the electromagnetic sensor inductance (the main characteristic of the electromagnetic sensor for this type of coupling) in several ways:

First: By the use of SFC, the length of the electromagnetic sensor or inductive element can be substantially increased without exceeding the area allowed in the card or label for the deployment of the electromagnetic sensor, thus increasing the inductance of the electromagnetic sensor or inductive element.

Second: By the inclusion of a suitably designed capacitive element connected in parallel to the electromagnetic sensor, the effective inductance that the pair capacitance/inductance presents to the card integrated circuit can be increased without affecting other operation parameters.

Third: By the optimization of the inductance value of the electromagnetic sensor it is possible to achieve values of this parameter that are suitable for the operation of the contactless or hybrid card or the radio operated electronic label without having to use multiple-turn loops.

This possibility is very interesting because it makes it possible to locate the two connection terminals of the electromagnetic sensor or inductive element in the internal region of the loop without the need to have a conductive path crossing over the loops, thus greatly simplifying the manufacturing techniques.

Fourth: because of the above-mentioned features, contactless cards, hybrid cards and radio frequency operated labels and tags can be reduced in size with respect to prior art.

Fifth: because of the above-mentioned features, contactless cards, hybrid cards and radio frequency operated labels and tags can be operated from a longer distance to the card detection device compared to those in the prior art.

In applications working at higher frequencies, where the operation of the device implies a radiation coupling (more that an inductive coupling) to the electromagnetic field generated by the coupling device (the card/label reader), this method allows an optimization of the electromagnetic sensor performance by allowing a reduction in the electromagnetic sensor size required for it to operate at the working frequency.

By the use of SFC's in this method, the use of the area where the electromagnetic sensor is being deployed is optimized, as the space-filling curves are able to pack a longer length in a smaller space than conventional curves (as meander-like curves or spiral curves).

In terms of manufacturing suitability, the fact that the electromagnetic sensor or inductive element can be manufactured without the need to cross over conductive paths allows the manufacturing of the electromagnetic sensor with a single layer construction method.

DETAILED DESCRIPTION OF THE PREFERRED EMBODIMENTS

Figure 1:
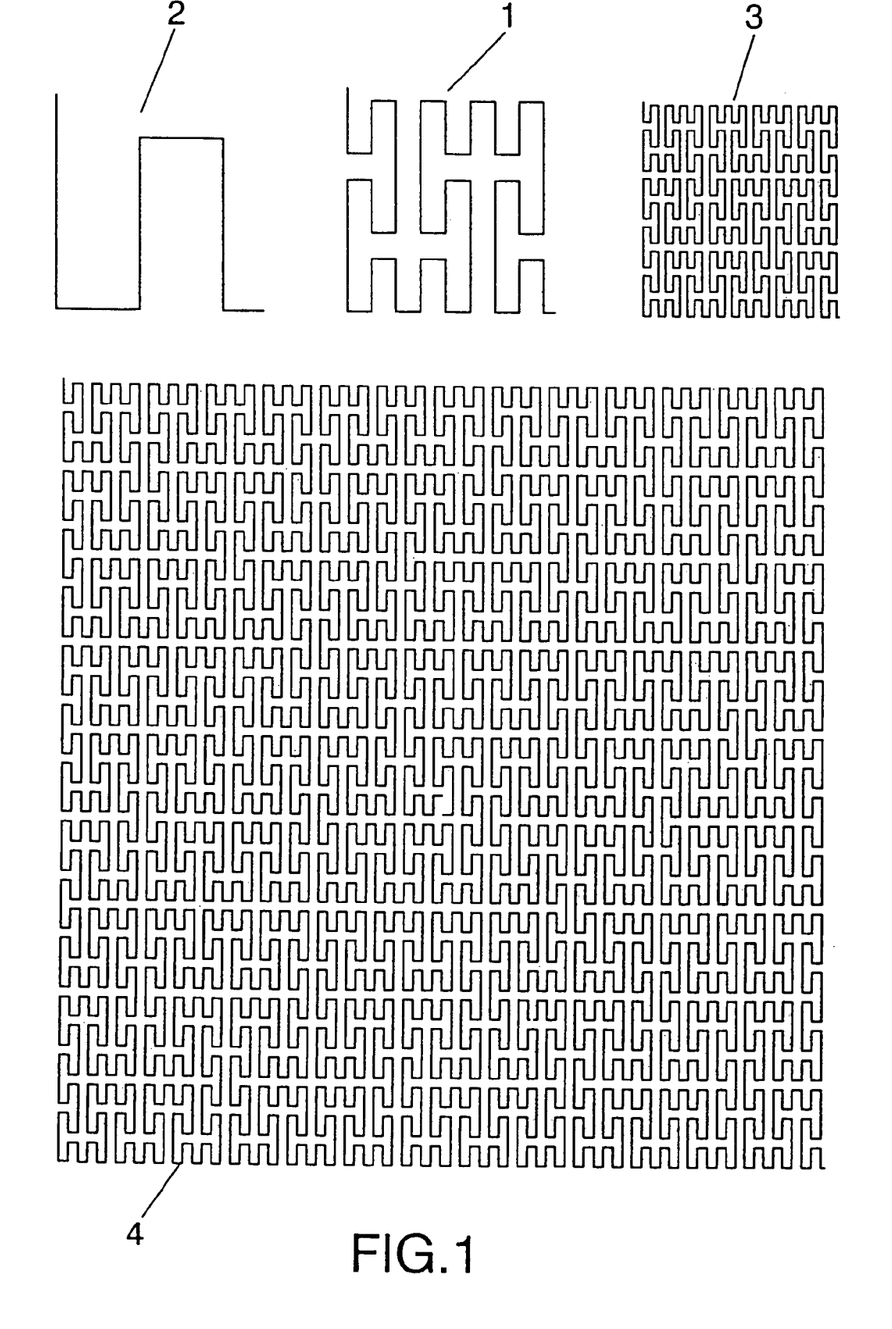
FIG. 1 shows some particular cases of SFC curves. From an initial curve 2, other curves 1, 3 and 4 with more than 10 connected segments are formed. This particular family of curves are named hereafter SZ curves.
Figure 2:
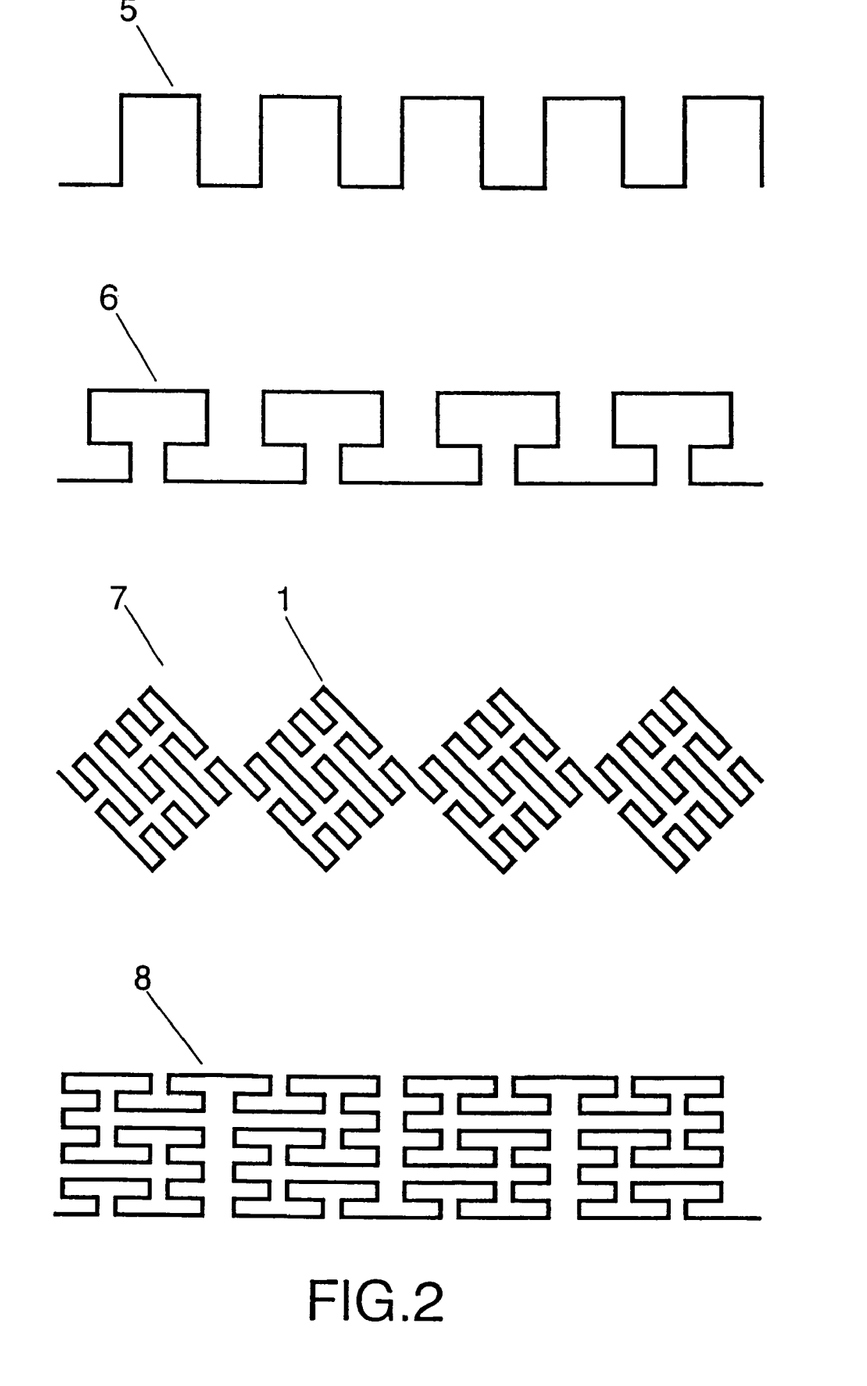
FIG. 2 shows a comparison between two prior art meandering lines (5 and 6) and two SFC periodic curves 7 and 8, constructed from the SZ curve of drawing 1. Periodic Curves 5 and 6 are not SFC because their periods are defined with less than ten segments.
Figure 3:
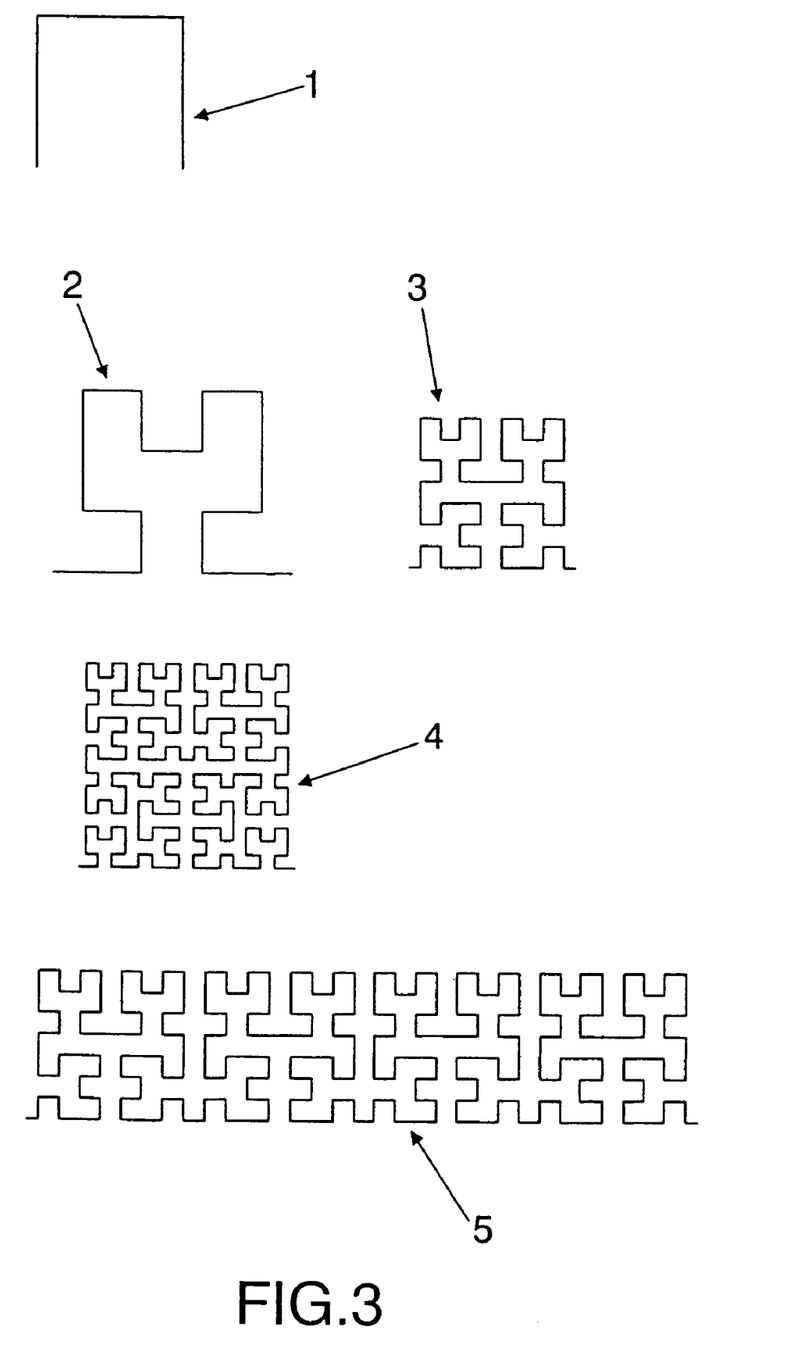
FIG. 3 shows a set of SFC curves (1, 2, 3, 4, 5) inspired on the Hilbert curve and hereafter named as Hilbert curves.
Figure 4:
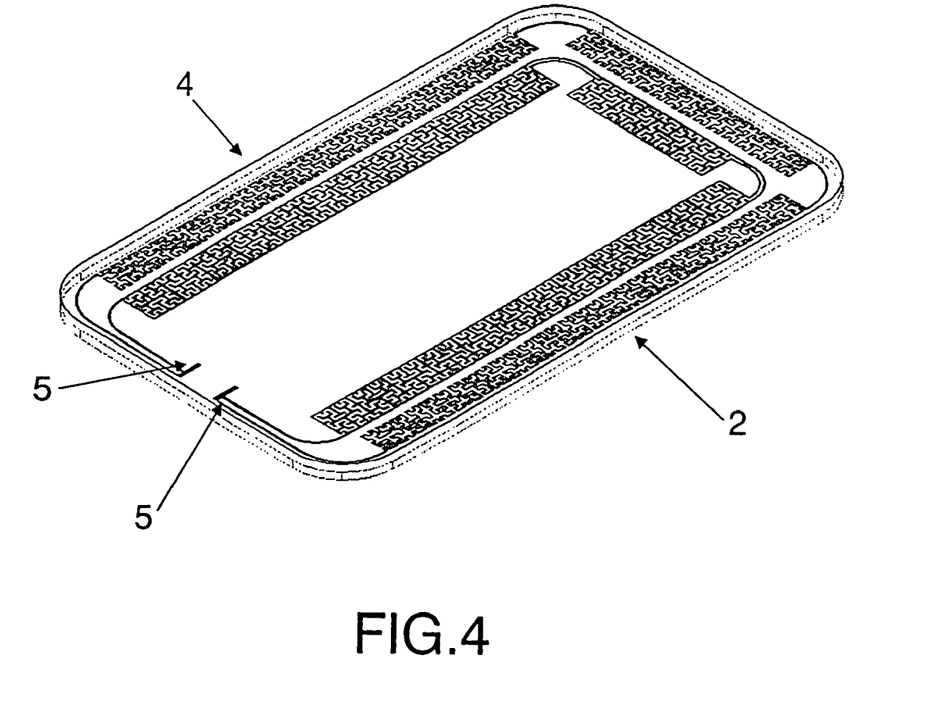
FIG. 4 shows a particular configuration of an electromagnetic sensor for contactless or hybrid cards. It consists on a flat single-turn rounded-corner rectangular loop with part of the straight segments that form the loop shaped as a SFC curve (2), and a coplanar flat capacitor connected in parallel to the loop with its gap shaped as a SFC curve (4). The electromagnetic sensor is connected to the contactless or hybrid card chip at the connection points (5).

FIG. 4 describes, without any limiting purpose, a preferred embodiment of a contactless identification device in particular a contactless or hybrid card comprising a pace-filling enhanced electromagnetic sensor. It is composed of a single-turn loop connected in parallel to a capacitor. A single-turn flat loop electromagnetic sensor in the shape of a round-cornered rectangle has been modified by replacing some of the straight lines that form the sides of the loop by a space-filling curve (SFC) (2). In this particular example, a particular case of a SFC (the Hilbert curve) has been chosen, but other SFC could be used instead. A flat coplanar capacitor is connected in parallel to the ends of the loop electromagnetic sensor. The gap of the flat capacitor has been modified by shaping it as a space-filling curve (SFC) (4). In this particular example, a particular case of a SFC (the Hilbert curve) has been chosen, but other SFC could be used instead. The two ends of the loop and the capacitor form the connecting terminals of the electromagnetic sensor (5).

This electromagnetic sensor can be manufactured, among other techniques, by means of any of the current printed circuit fabrication techniques, by means of conductive ink printed on a dielectric sheet-shaped substrate, by electrolytic etching of part of the metal layer of a metal-dielectric sandwich sheet, etc. The electromagnetic sensor is later on integrated in the manufacturing of contactless or hybrid cards (6). For reasons of external appearance, the electromagnetic sensor is usually integrated in some of the inner layers of the card body. The connecting points of the contactless card chip would be connected to the electromagnetic sensor connecting terminals by means of any of the available procedures, such as for instance using conductive paste, or by direct soldering of the chip connecting points to the electromagnetic sensor terminals. In a hybrid card application, the connecting points of the hybrid card chip would be connected to the electromagnetic sensor connecting terminals by means of conductive paste of some other method to overcome the thickness of the card body between the card surface, where the chip is attached to allow regular contact operation of the card, and the inner layer where the electromagnetic sensor is located.

As it can be appreciated from FIG. 4, the whole electromagnetic sensor structure is located in one single level, without the need of conducting wires or stripes crossing over other parts of the electromagnetic sensor. This quality allows a very simple manufacturing of the electromagnetic sensor, as only one single layer of printed board, or one single dielectric sheet printed with conductive ink, for instance, need to be used. The fact of having all the electromagnetic sensor connection points at the same level as the rest of the electromagnetic sensor structure allows a simpler industrialization of the mechanical tasks required to connect the contactless chip or implant and connect the hybrid card chip (as drilling, depositing of conductive pastes, soldering, etc.).

This electromagnetic sensor architecture is suitable for all the applications where contactless or hybrid cards are of advantage: high volume paying and toll applications (public transportation, public sport events, etc.), person and good identification (access to controlled areas, control of shipment of goods, handling of luggage, product control in chain production environments, etc.), etc.

Figure 5:
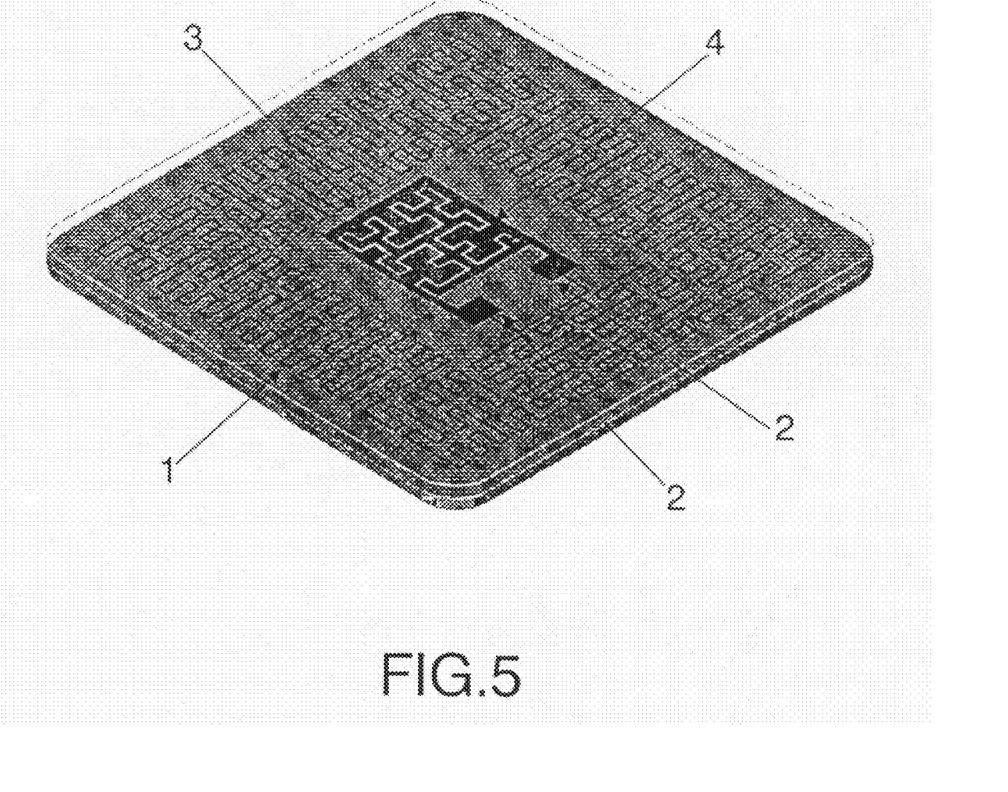
FIG. 5 shows a particular configuration of an electromagnetic sensor for electronic label or tag. It consists on a single turn square flat loop with the straight lines that form the loop shaped as a SFC curve (1), and a coplanar flat capacitor (3) connected in parallel to the loop with its gap (4) shaped as a SFC curve. The electromagnetic sensor is connected to the electronic label chip or electronic tag chip at the connection points (2).

FIG. 5 describes another preferred embodiment of a space-filling enhanced electromagnetic sensor for a electronic label or radio frequency operated tag. A square flat loop has been modified by substituting the straight parts of the loop wire by SFC structures (1). In this particular example, a particular case of a SFC (the SZ curve) has been chosen, but other SFC could be used instead. The two ends of the arms form the connecting terminals of the electromagnetic sensor (2). At the same time, a flat coplanar capacitor (3) is shown connected in parallel to the electromagnetic sensor connection terminals. The shape of the gap of the capacitor (4) has been modified with a SFC curve. In this particular example, a particular case of a SFC (the Hilbert curve) has been chosen, but other SFC could be used instead. The capacitance of the capacitor and the inductance of the loop form a parallel resonant circuit. This electromagnetic sensor can be manufactured, among other techniques, by means of any of the current printed circuit fabrication techniques, by means of conductive ink printed on a dielectric sheet-shaped substrate, etc. The antenna is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals. As it can be appreciated from FIG. 5, the whole electromagnetic sensor structure is located in one single level, without the need of conducting wires or stripes crossing over other parts of the electromagnetic sensor. This quality allows a very simple manufacturing of the electromagnetic sensor, as only one single layer of printed board, or one single dielectric sheet printed with conductive ink, for instance, need to be used. The fact of having all the electromagnetic sensor connection points at the same level as the rest of the electromagnetic sensor structure allows a simpler industrialization of mechanical tasks as drilling, depositing of conductive pastes, soldering, etc. This electromagnetic sensor architecture is suitable for all the applications where radio operated electronic label or electronic tags are of advantage: shopping antitheft applications, contactless intelligent shopping karts, identification of goods and control of stocks in real time, etc.

Figure 6:
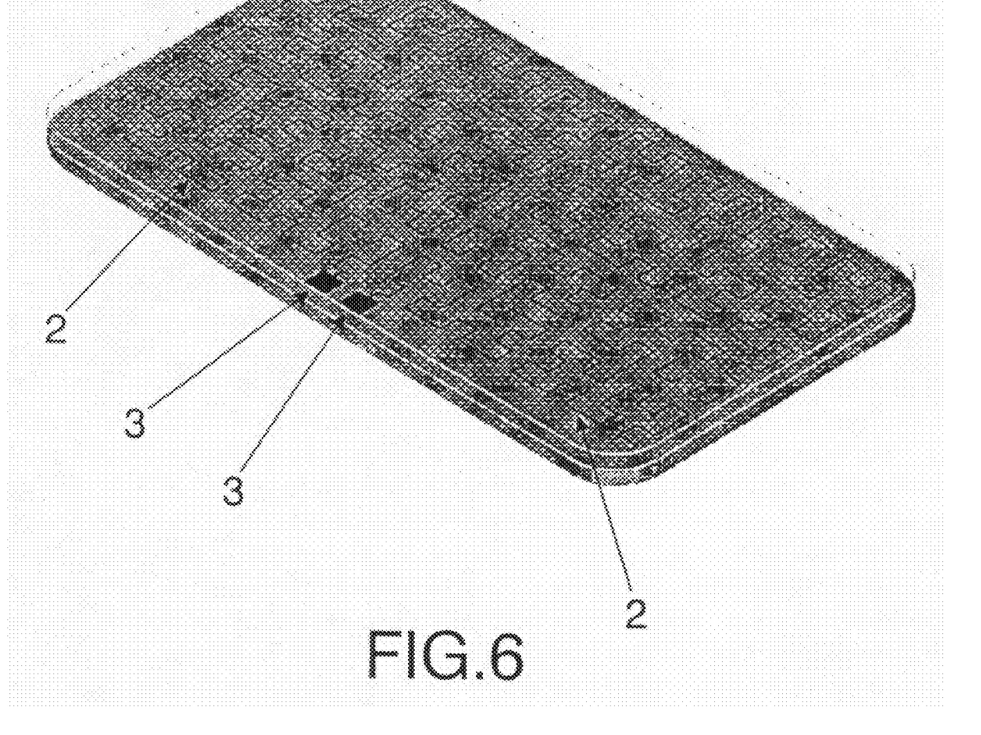
FIG. 6 shows an example of a dipole electromagnetic sensor for an electronic label of radio frequency operated electronic tag, wherein each of the dipole arms (2) is shaped as an SFC curve. The electronic label chip or the electronic tag chip is connected at the terminals of the electromagnetic sensor (3).

Another preferred embodiment for a space-filling enhanced electromagnetic sensor for a electronic label or radio frequency operated tag is shown in FIG. 6. A wire dipole electromagnetic sensor has been modified by substituting the dipole arms (2) by SFC curves. In this particular example, a particular case of a SFC (the Hilbert curve) has been chosen, but other SFC could be used instead. The two ends of the arms form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 7:
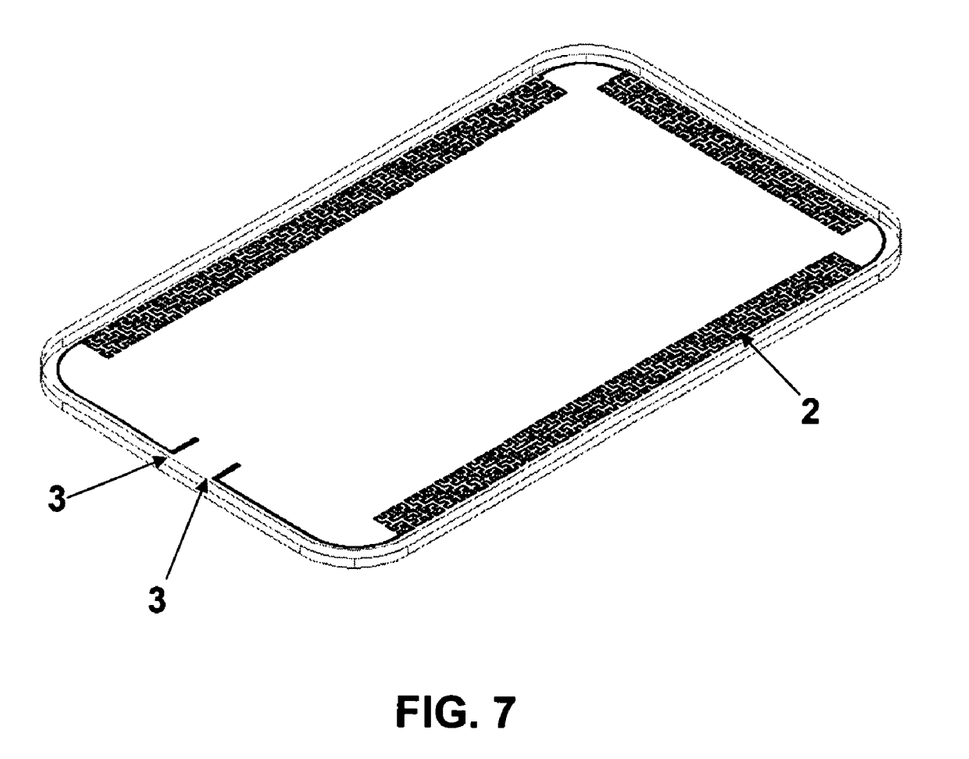
FIG. 7 shows a particular configuration of an electromagnetic sensor for contactless or hybrid cards. It consists on a flat single-turn rounded-corner rectangular loop whit part of the straight segments that form the loop shaped as a SFC curve (2). The electromagnetic sensor is connected to the contactless or hybrid card chip at the connection points (3).

FIG. 7 describes another preferred embodiment of a space-filling enhanced electromagnetic sensor for a contactless or hybrid card. A single-turn flat loop in the shape of a round-cornered rectangle (2) has been modified by replacing some of the straight lines that form the sides of the loop by a space-filling curve (SFC). In this particular example, a particular case of a SFC (the Hilbert curve) has been chosen, but other SFC could be used instead. The two ends of the loop form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, by electrolytic etching of part of the metal layer of a metal-dielectric sandwich sheet, etc. The electromagnetic sensor is later on integrated in the manufacturing of contactless or hybrid cards. For reasons of external appearance, the electromagnetic sensor is usually integrated in some of the inner layers of the card body. The connecting points of the contactless card chip would be connected to the electromagnetic sensor connecting terminals by means of conductive paste, or by direct soldering of the chip connecting points to the electromagnetic sensor terminals. In a hybrid card application, the connecting points of the hybrid card chip would be connected to the electromagnetic sensor connecting terminals by means of conductive paste of some other method to overcome the thickness of the card body between the card surface, where the chip is attached to allow regular contact operation of the card, and the inner layer where the electromagnetic sensor is located. With this new single-turn loop electromagnetic sensor architecture the need of wires crossing over other parts of the electromagnetic sensor is eliminated, and therefore the manufacturability of the system is greatly simplified as it is not necessary to include extra layers in the card body to allow the positioning of both electromagnetic sensor connecting terminals at the side of the electromagnetic sensor loop.

Figure 8:
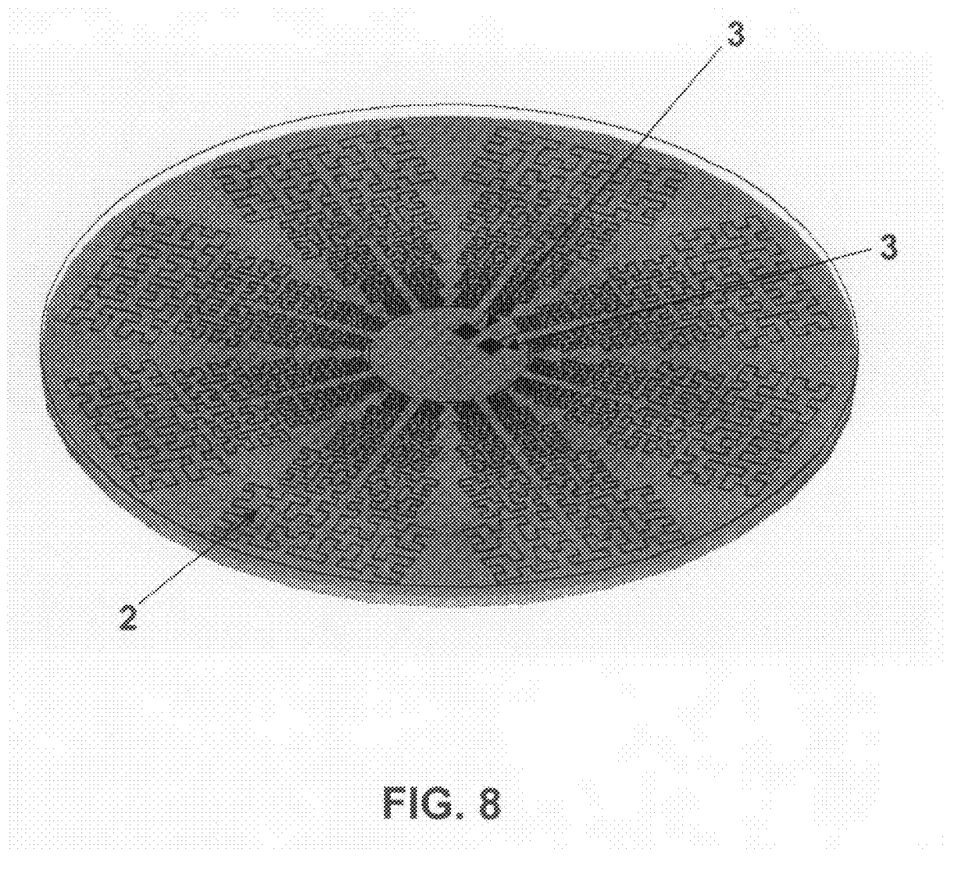
FIG. 8 shows an example of a loop antenna for an electronic label of radio frequency operated electronic tag, wherein a flat single-turn circular loop has been modified by including radially-oriented SFC curves (2). The electronic label chip or the electronic tag chip is connected at the terminals of the electromagnetic sensor (3).

FIG. 8 describes another preferred embodiment of a space-filling enhanced electromagnetic sensor for a electronic label or radio frequency operated tag. A single-turn flat circular loop has been modified by including radially-oriented SFC structures (2) that optimize the distribution of the electromagnetic sensor wire over the surface of the tag in order to maximize the performance of the electromagnetic sensor. In this particular example, a particular case of a SFC (the Hilbert curve) has been chosen, but other SFC could be used instead. The two ends of the loop form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 9:
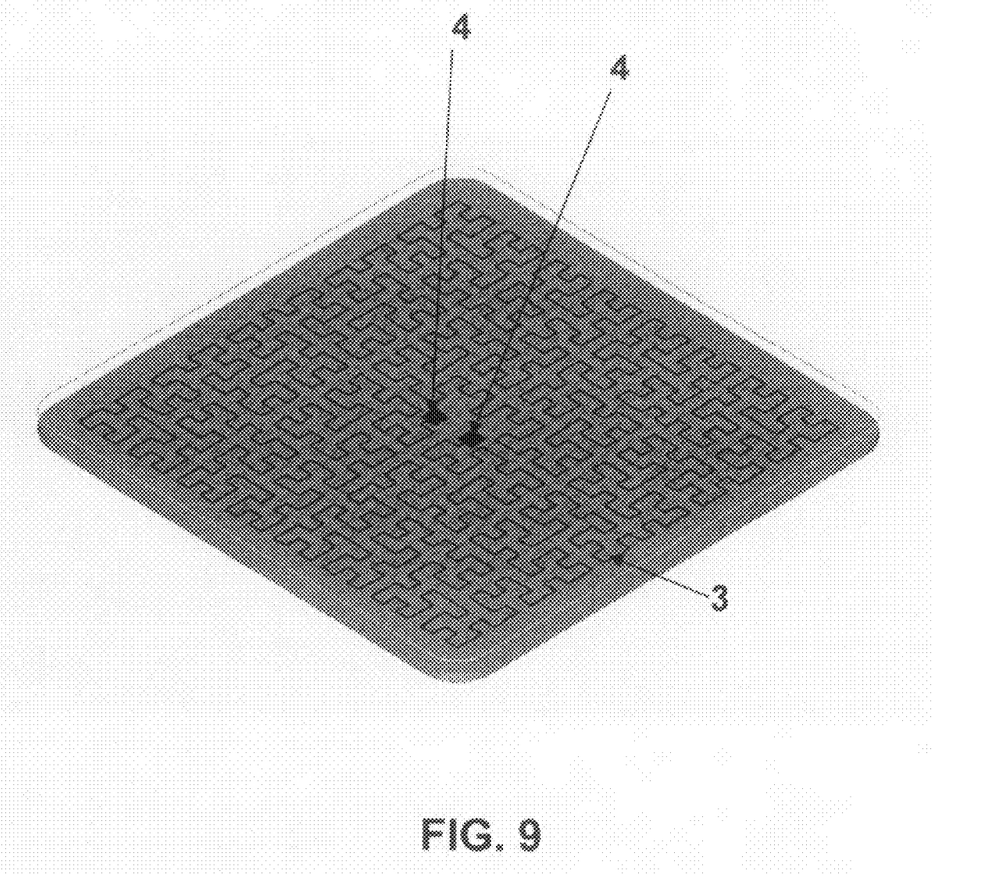
FIG. 9 shows an example of a lop electromagnetic sensor for an electronic label or radio frequency operated electronic tag, where in a flat single-turn square loop has been modified by including a SFC curve (3). The electronic label chip or the electronic tag chip is connected at the terminals of the electromagnetic sensor (4).

FIG. 9 describes another preferred embodiment of a space-filling enhanced electromagnetic sensor for a electronic label or radio frequency operated tag. A single-turn flat squared loop has been modified by including SFC curves (3) that optimize the distribution of the electromagnetic sensor wire over the surface of the tag in order to maximize the performance of the electromagnetic sensor. In this particular example, a particular case of a SFC (the Hilbert curve) has been chosen, but other SFC could be used instead. The two ends of the loop form the connecting terminals of the electromagnetic sensor (4). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 11:
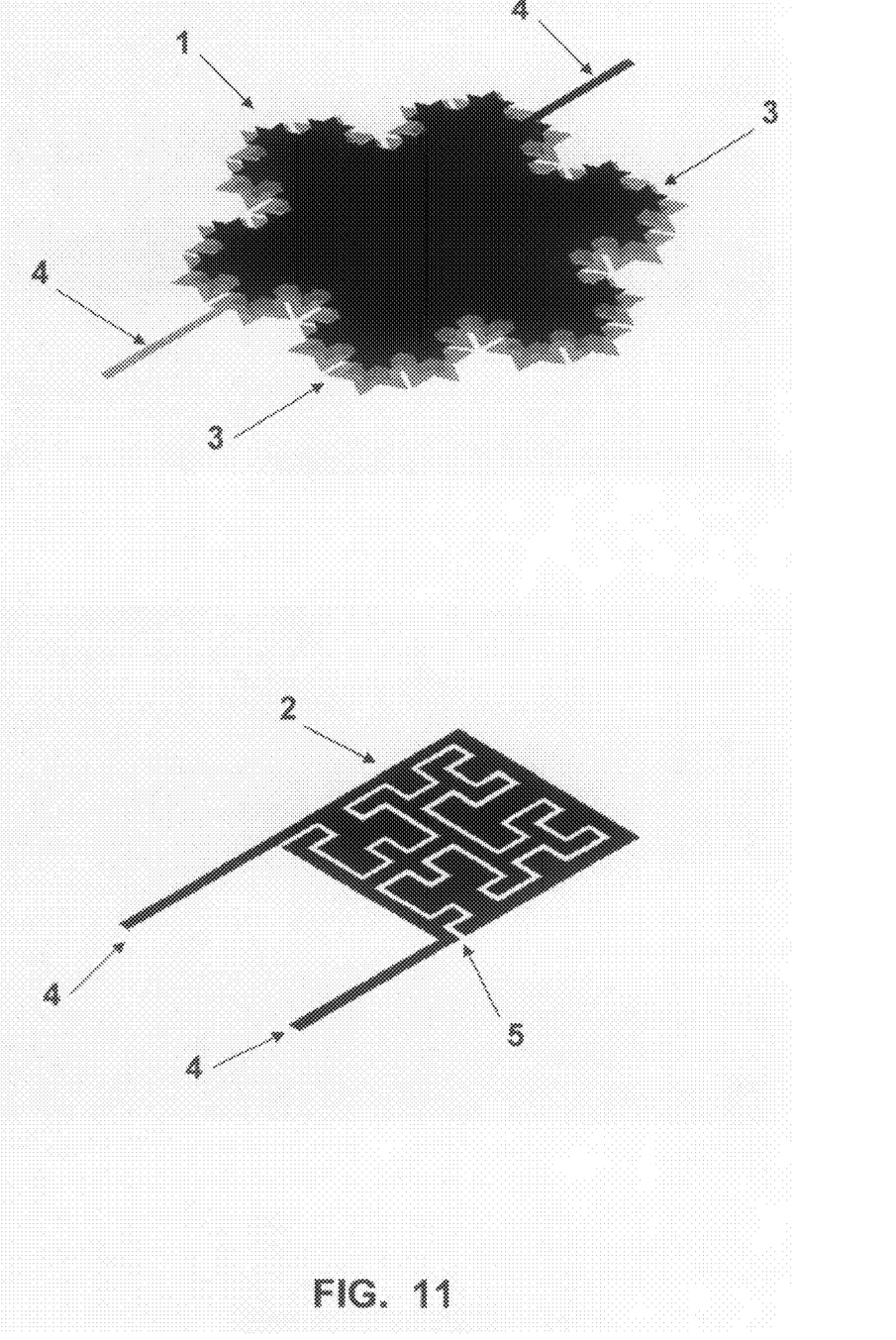
FIG. 11 shows two examples of capacitive elements with space filling curves applied to their shapes. In a parallel plate capacitor (1), the conductive surfaces (3) have been shaped a space-filling curve. In a coplanar capacitor (2), the shape of the gap between the conductive surfaces (5) has been shaped following a space-filling curve.

FIG. 11 describes, without any limiting purpose, two examples of preferred embodiments of capacitors with the application of space-filling curves to their shape. In a parallel plate capacitor (1) the two parallel conducting surfaces have been shaped following a space-filling curve. The capacitance of the element depends on the thickness of the insulating layer between the parallel plates, the kind of dielectric between the plates, and the effective area of the plates. Each of the two connecting terminals of the element (4) is connected to one of the plates. This capacitor can be manufactured, among other techniques, by means of any of the current printed circuit fabrication techniques, by means of conductive ink printed on a dielectric sheet-shaped substrate, etc., taking always into account that two conductive layers, separated by an insulating layer of a determined thickness, are required. The final element would be encapsulated with some dielectric material in order to prevent damaging of the parallel plates, while leaving the connection terminals out of the encapsulation. In a coplanar capacitor (2), and taking into account that the capacitance value is determined mainly by the length and the width of the gap between the coplanar conductive surfaces (5), the gap has been shaped following a space-filling curve, thus maximizing the length of the gap without increasing the total area of the component. This capacitor can be manufactured, among other techniques, by means of any of the current printed circuit fabrication techniques, by means of conductive ink printed on a dielectric sheet-shaped substrate, etc. In this type of capacitors, only one layer of conductive surface is required, making it especially suitable for mass production. After the shaping of the two coplanar conductive surfaces, the whole structure would be encapsulated with some dielectric material in order to prevent damaging of the conductive surfaces, while leaving the connection terminals (4) out of the encapsulation.

The invention claimed is:

1. A contactless identification device comprising:
   a capacitive element;
   an inductive element connected in parallel with and on a common layer of the contactless identification device with the capacitive element;
   wherein the inductive element comprises a conducting wire or strip defining a single-turn flat loop and two connection terminals;
   wherein the capacitive element comprises a first conducting portion and a second conducting portion, the first and second conducting portions being coplanar, the first conducting portion being connected to a first connection terminal of the inductive element and the second conducting portion being connected to a second connection terminal of the inductive element;
   an integrated circuit interoperably connected between the first and second connection terminals of the inductive element;
   wherein at least part of the first conducting portion is shaped as a first curve comprising a plurality of connected segments; and
   wherein the plurality of connected segments are spatially arranged so that no adjacent connected segments form a longer straight segment.

2. The contactless identification device of claim 1, wherein:
   the first curve comprises at least ten segments; and
   each of the plurality of connected segments is smaller than a tenth of a free-space operating wavelength.

3. The contactless identification device of claim 2, wherein the first curve is periodic along a fixed straight direction of space if and only if the period is defined by a non-periodic curve comprising at least ten connected segments and no pair of the adjacent connected segments defines a straight longer segment.

4. The contactless identification device of claim 1, wherein the at least part of the first conducting portion shaped as the first curve is the perimeter of the first conducting portion.

5. The contactless identification device of claim 1, wherein corners formed by each pair of adjacent connected segments are rounded or smoothed.

6. The contactless identification device of claim 1, wherein:
   the first curve features a box-counting dimension larger than one;
   the box-counting dimension is computed as the slope of a straight portion of a log-log graph; and
   the straight portion is defined as a straight segment over at least an octave of scales on the horizontal axis of the log-log graph.

7. The contactless identification device of claim 6, wherein the box-counting dimension is larger than 1.2.

8. The contactless identification device of claim 6, wherein the box-counting dimension is larger than 1.5.

9. The contactless identification device of claim 1, wherein:
   at least a part of the second conducting portion is shaped as a second curve comprising a plurality of connected segments; and the plurality of connected segments of the second conducting portion are spatially arranged so that no pair of adjacent connected segments forms a longer straight segment.

10. The contactless identification device of claim 9, wherein the first curve and the second curve have the same number of connected segments.

11. The contactless identification device of claim 9, wherein:
the first curve and the second curve feature the same box-counting dimension;
the box-counting dimension is computed as the slope of the straight portion of a log-log graph;
the straight portion is defined as a straight segment over at least an octave of scales on the horizontal axis of the log-log graph; and
the box-counting dimension is larger than one.

12. The contactless identification device of claim 1, wherein the contactless identification device is selected from the group consisting of a contactless card, a hybrid card, a radio-operated electronic label, and a radio-operated electronic tag.

13. The contactless identification device of claim 1, wherein the contactless identification device is adapted for an application selected from the group consisting of high-volume payment, toll payment, person identification, access control to restricted areas, goods identification, shipment control, luggage handling, and product control in chain-production environments.

14. The contactless identification device of claim 1, wherein the two connection terminals are located in an internal region of the single-turn flat loop.

15. A contactless identification device comprising:
an integrated circuit;
an electromagnetic sensor configured as a dipole, the dipole comprising first and second conducting arms;
a capacitive element comprising first and second conducting surfaces;
wherein the electromagnetic sensor and the capacitive element are on a common layer of the contactless identification device;
wherein the first conducting surface is connected to an end of the first conducting arm and the second conducting surface is connected to an end of the second conducting arm;
wherein at least a portion of at least one of the first and second conducting arms is shaped as a curve comprising a plurality of connected segments; and
wherein the plurality of connected segments are spatially arranged so that no adjacent connected segments form a longer straight segment.

16. The contactless identification device of claim 15, wherein:
the curve comprises at least ten segments; and
each of the plurality of connected segments is smaller than a tenth of a free-space operating wavelength.

17. The contactless identification device of claim 16, wherein the curve is periodic along a fixed straight direction of space if and only if the period is defined by a non-periodic curve comprising at least ten connected segments and no pair of the adjacent connected segments defines a straight longer segment.

18. The contactless identification device of claim 15, wherein the at least a portion shaped as the curve is the perimeter of the first conducting arm.

19. The contactless identification device of claim 15, wherein corners formed by each pair of adjacent connected segments are rounded or smoothed.

20. The contactless identification device of claim 15, wherein:
the curve features a box-counting dimension larger than one;
the box-counting dimension is computed as the slope of a straight portion of a log-log graph; and
the straight portion is defined as a straight segment over at least an octave of scales on the horizontal axis of the log-log graph.

21. The contactless identification device of claim 20, wherein the box-counting dimension is larger than 1.2.

22. The contactless identification device of claim 20, wherein the box-counting dimension is larger than 1.5.

23. The contactless identification device of claim 15, wherein:
at least a portion of the first conducting arm is shaped as said curve;
at least a portion of the second conducting arm is shaped as a second curve comprising a plurality of connected segments; and
the plurality of connected segments of the second conducting surface are spatially arranged so that no pair of adjacent connected segments forms a longer straight segment.

24. The contactless identification device of claim 23, wherein the curve and the second curve have the same number of connected segments.

25. The contactless identification device of claim 23, wherein:
the curve and the second curve feature the same box-counting dimension;
the box-counting dimension is computed as the slope of the straight portion of a log-log graph;
the straight portion is defined as a straight segment over at least an octave of scales on the horizontal axis of the log-log graph; and
the box-counting dimension is larger than one.

26. The contactless identification device of claim 15, wherein the contactless identification device is selected from the group consisting of a contactless card, a hybrid card, a radio-operated electronic label, and a radio-operated electronic tag.

27. The contactless identification device of claim 15, wherein the contactless identification device is adapted for an application selected from the group consisting of high-volume payment, toll payment, person identification, access control to restricted areas, goods identification, shipment control, luggage handling, and product control in chain-production environments.

28. A contactless identification device comprising:
an electromagnetic sensor comprising a dipole, the dipole comprising first and second coplanar conducting arms, each of the first and second coplanar conducting arms comprising a connecting terminal;
an integrated circuit connected between the connecting terminals;
a conducting surface surrounding the integrated circuit and connected in parallel with and forming a parallel resonant circuit with the electromagnetic sensor;
wherein the electromagnetic sensor and the conducting surface are on a common layer of the contactless identification device;

wherein at least a portion of at least one of the first and second coplanar conducting arms is shaped as a curve comprising a plurality of connected segments;

wherein the plurality of connected segments are spatially arranged so that no adjacent connected segments form a longer straight segment.

29. The contactless identification device of claim 28, wherein the two coplanar conducting arms surround the conducting surface.

30. The contactless identification device of claim 28, wherein the two coplanar conducting arms are arranged symmetrically at opposite sides of the integrated circuit.

31. The contactless identification device of claim 28, wherein:

the curve comprises at least ten segments; and each of the plurality of connected segments is smaller than a tenth of a free-space operating wavelength.

32. The contactless identification device of claim 31, wherein the curve is periodic along a fixed straight direction of space if and only if the period is defined by a non-periodic curve comprising at least ten connected segments and no pair of the adjacent connected segments defines a straight longer segment.

33. The contactless identification device of claim 28, wherein the at least a portion shaped as the curve is the perimeter of the first coplanar conducting arm.

34. The contactless identification device of claim 28, wherein corners formed by each pair of adjacent connected segments are rounded or smoothed.

35. The contactless identification device of claim 28, wherein:

the curve features a box-counting dimension larger than one;

the box-counting dimension is computed as the slope of a straight portion of a log-log graph; and the straight portion is defined as a straight segment over at least an octave of scales on the horizontal axis of the log-log graph.

36. The contactless identification device of claim 35, wherein the box-counting dimension is larger than 1.2.

37. The contactless identification device of claim 35, wherein the box-counting dimension is larger than 1.5.

38. The contactless identification device of claim 28, wherein:

at least a portion of first conducting arm is shaped as said curve;

at least a portion of the second conducting arm is shaped as a second curve comprising a plurality of connected segments; and the plurality of connected segments are spatially arranged so that no pair of adjacent connected segments forms a longer straight segment.

39. The contactless identification device of claim 38, wherein the curve and the second curve have the same number of connected segments.

40. The contactless identification device of claim 38, wherein:

the curve and the second curve feature the same box-counting dimension;

the box-counting dimension is computed as the slope of the straight portion of a log-log graph;

the straight portion is defined as a straight segment over at least an octave of scales on the horizontal axis of the log-log graph; and the box-counting dimension is larger than one.

41. The contactless identification device of claim 28, wherein the contactless identification device is selected from the group consisting of a contactless card, a hybrid card, a radio-operated electronic label, and a radio-operated electronic tag.

42. The contactless identification device of claim 28, wherein the contactless identification device is adapted for an application selected from the group consisting of high-volume payment, toll payment, person identification, access control to restricted areas, goods identification, shipment control, luggage handling, and product control in chain-production environments.

43. A contactless identification system comprising:

a coupling device; and at least one contactless identification device comprising:

an electromagnetic sensor comprising a first and a second conducting arm, each of the first and the second conducting arm having a connecting terminal connected thereto; and an integrated circuit connected between the two connecting terminals;

wherein the size of the electromagnetic sensor is determined by a free-space operating wavelength so that the electromagnetic sensor is radiation-coupled to the coupling device;

wherein at least a portion of the electromagnetic sensor is shaped as a space-filling curve comprising at least ten connected segments; and wherein each of the at least ten connected segments is smaller than a tenth of the free-space operating wavelength and is spatially arranged so that no adjacent connected segment forms a longer straight segment.

44. The contactless identification system of claim 43, wherein the at least a portion shaped as the space-filling first curve is the perimeter of the first conducting arm.

45. The contactless identification system of claim 43, wherein corners formed by each pair of adjacent connected segments are rounded or smoothed.

46. The contactless identification system of claim 43, wherein the space-filling curve is periodic along a fixed straight direction of space if and only if the period is defined by a non-periodic curve comprising at least ten connected segments and no pair of the adjacent connected segments defines a straight longer segment.

47. The contactless identification system of claim 43, wherein:

the space-filling curve features a box-counting dimension larger than one;

the box-counting dimension is computed as the slope of a straight portion of a log-log graph; and the straight portion is defined as a straight segment over at least an octave of scales on the horizontal axis of the log-log graph.

48. The contactless identification system of claim 47, wherein the box-counting dimension is larger than 1.2.

49. The contactless identification system of claim 47, wherein the box-counting dimension is larger than 1.5.

50. The contactless identification system of claim 43, wherein the contactless identification device is selected from the group consisting of a contactless card, a hybrid card, a radio-operated electronic label, and a radio-operated electronic tag.

51. The contactless identification system of claim 43, wherein the contactless identification device is adapted for an application selected from the group consisting of high-volume payment, toll payment, person identification, access control to restricted areas, goods identification, shipment control, luggage handling, and product control in chain-production environments.

* * * * *